(12) United States Patent
Pollard (10) Patent No.: US 7,577,351 B2
(45) Date of Patent: Aug. 18, 2009

(54) IMAGE DATA PROCESSING METHOD AND APPARATUS

(75) Inventor: Stephen B. Pollard, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 456 days.

(21) Appl. No.: 11/492,183

(22) Filed: Jul. 25, 2006

(65) Prior Publication Data

US 2007/0053676 A1 Mar. 8, 2007

(30) Foreign Application Priority Data

Sep. 8, 2005 (GB) .................................. 0518280.3

(51) Int. Cl.
G03B 13/00 (2006.01)
G03B 3/00 (2006.01)
H04N 5/232 (2006.01)

(52) U.S. Cl. .......................... 396/125; 396/80; 396/128; 348/353; 348/354; 250/201.7

(58) Field of Classification Search .................. 396/125, 396/89, 79, 80, 82, 93, 102–104, 126, 128; 348/345, 349, 353–355; 250/201.2, 201.7
See application file for complete search history.

(56) References Cited

U.S. PATENT DOCUMENTS 4,967,280 A * 10/1990 Takuma et al. ............... 348/355

| | | | |
|---|---|---|---|
| 5,170,202 A | 12/1992 | Bell | |
| 5,231,443 A | 7/1993 | Subbarao | |
| 5,448,329 A | 9/1995 | Nakata | |
| 2004/0227843 A1* | 11/2004 | Watanabe | 348/354 |

FOREIGN PATENT DOCUMENTS

| | | |
|---|---|---|
| EP | 0 268 246 | 5/1988 |
| EP | 0 347 042 | 12/1989 |
| JP | 06303489 | 10/1994 |
| JP | 07159685 | 6/1995 |
| JP | 2003244519 | 8/2003 |
| JP | 2004085964 | 3/2004 |

* cited by examiner

Primary Examiner—Rochelle-Ann J Blackman (57) ABSTRACT

A method for automatic focus for an image capture device comprising a lens, the method comprising, for a first lens position, processing image data generated at a plurality of local focus positions of the lens in order to generate first metric data representing a focus measure for the first lens position, adjusting the lens position on the basis of the first metric data, and generating corresponding second metric data for at least one local focus position at the new lens position, and determining an estimated point of true focus for the lens on the basis of the first and second metric data.

17 Claims, 6 Drawing Sheets

FIGURE 6

IMAGE DATA PROCESSING METHOD AND APPARATUS

CLAIM TO PRIORITY

This application claims priority from co-pending United Kingdom utility application entitled, "Image Data Processing Method and Apparatus" having serial no. GB 0518280.3, filed Sep. 8, 2005, which is entirely incorporated herein by reference.

FIELD OF THE INVENTION

The present invention relates generally to the field of image data processing.

BACKGROUND

Autofocus systems in cameras and camcorders for automatically focussing on a scene or object are known. Generally with such systems, a camera lens projects light representative of an image onto an image sensor such as a CCD or CMOS device. An autofocus (AF) module can retrieve data representative of a portion of the projected image, which can be processed by a microprocessor (CPU) in order to determine contrast information from the portion, for example. Using a suitable metric, the contrast information can provide a measure of the accuracy of focus. The CPU can activate an autofocus motor of the camera to move the camera lens for focusing, and the procedure can repeat until a subject falls within a desired level of focus.

U.S. Pat. No. 5,170,202 describes a method of autofocus based upon an image contrast metric similar to that described above.

Best focus is associated with the location of greatest image contrast as measured from a difference between brightest and darkest parts of an image.

In addition to contrast metrics, autofocus metrics can be based on various forms of high frequency image data such as gradients for example. In such cases it is necessary to overcome noise in the image data for better low light performance of the autofocus method.

In general, autofocus systems based on focus metrics have the disadvantage that the focus range must be searched at a granularity which is required to give accurate focus. Various techniques to speed up this search (such as stopping at a given point of focus when true focus is located) or locating the peak at a finer resolution than the search steps (such as using quadratic interpolation of the focus metric around a coarse peak), and methods to estimate true focus from as little as two steps are known. For example, U.S. Pat. No. 5,231,443 describes a rapid autofocus system. It is based on a depth from defocus method in which the difference in low frequency components of a pair of out of focus images is taken to depend on distance to the true focus. A ratio of the absolute power or absolute value of the low frequency components is used to define a metric which can be related to focus position.

This relationship only holds in general over a small region on either side of the true focus. At greater distances from true focus, only the very lowest frequency components of an image hold any useful information, and this is generally too little to reliably predict the true focus position.

SUMMARY

According to a first aspect of the present invention there is provided a method for automatic focus for an image capture device comprising a lens, the method comprising, for a first lens position, processing image data generated at a plurality of local focus positions of the lens in order to generate first metric data representing a focus measure for the first lens position, adjusting the lens position on the basis of the first metric data, and generating corresponding second metric data for at least one local focus position at the new lens position, and determining an estimated point of true focus for the lens on the basis of the first and second metric data.

According to a second aspect of the present invention there is provided a method of automatic focus for use with an image capture device comprising a lens, the method comprising, processing image data generated at a plurality of local focus settings for a first lens position in order to generate first metric data representing a focus measure for the first lens position, adjusting the lens position on the basis of the first metric data, generating corresponding second metric data for at least one local focus position at the new lens position, determining if a change of sign has occurred between respective values of said first and second metric data, and on the basis of the determination, interpolating or extrapolating a position representing true focus for the lens.

According to a third aspect of the present invention there is provided image capture apparatus comprising a lens and a processor, the processor operable to, for a first lens position, process image data generated at a plurality of local focus positions of the lens, in order to generate first metric data representing an image content independent metric for the first lens position, on the basis of the first metric data, generate data operable to effect adjustment of the lens positions and generate corresponding second metric data for at least one local focus position at the new lens position, and determine an estimated point of true focus for the lens on the basis of the first and second metric data.

BRIEF DESCRIPTION OF THE FIGURES

For a better understanding of the present invention, and to further highlight the ways in which it may be brought into effect, embodiments will now be described, by way of example only, with reference to the following drawings in which:—

It should be emphasised that the term "comprises/comprising" when used in this specification specifies the presence of stated features, integers, steps or components but does not preclude the presence or addition of one or more other features, integers, steps, components or groups thereof.

DETAILED DESCRIPTION OF PREFERRED EMBODIMENTS

Figure 1:
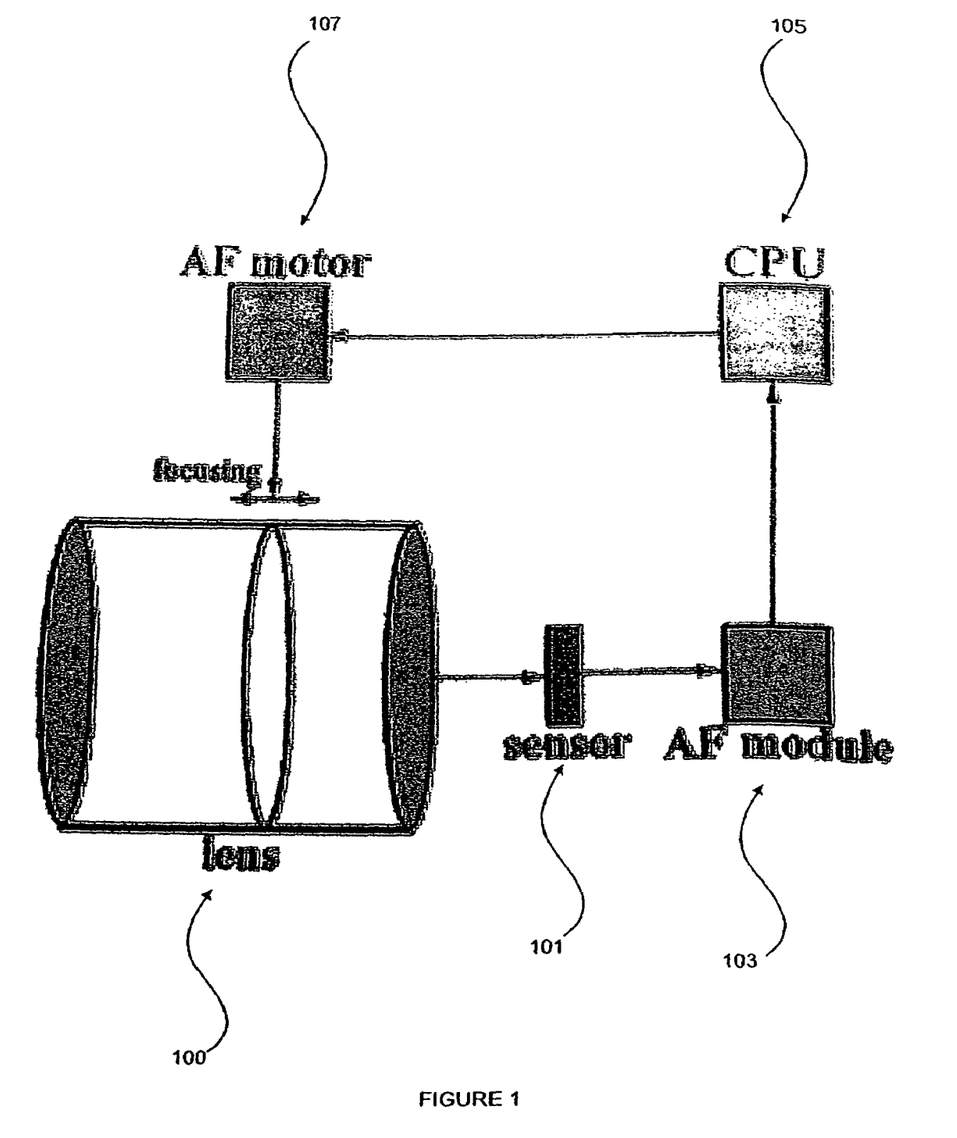
FIG. 1 is a schematic representation of a typical autofocus system of a camera or camcorder.

FIG. 1 is a schematic representation of a typical autofocus system. A lens 100 of a camera, which can be a digital or analogue camera or camcorder for example, receives and focuses light onto a suitable sensor 101 in order to generate image data. Sensor 101 can be a CCD or CMOS device for example, or other suitable device. AF module 103 is operable to retrieve or receive a portion of the image data. CPU 105 is operable to process data relating to the portion. For example, the processed data can relate to contrast information of the image portion. Other alternatives are possible. The retrieved portion can represent a rectangular portion of the image for example, or other suitable shaped portion. CPU 105 can activate the auto focus motor 107 in order to facilitate movement of lens 100 for focusing based on the processing result. It will be appreciated that lens 100 is illustrated as comprising a number of elements. As is customary, an individual element of lens 100 can be adjusted, or multiple (e.g. some or all) elements can be adjusted in order to manipulate focus. For the sake of clarity, reference will be made herein to lens 100, and not to individual elements, but this is not intended to be limiting. Further, reference to adjustment of a lens position can include adjustment of an individual element of a lens, which element can be an internal element for example. Alternatively, adjustment can be made to one or more other device parameters.

According to a preferred embodiment, image data generated at two respective focus positions of lens 100 is used to generate a power ratio which can be used as a focus metric. For a given lens position, the power ratio is a normalised power ratio between pairs of images captured at different local focus positions situated around the lens position. Preferably the ratio is generated in the spatial or Fourier domain. Other alternatives are possible.

So, for example, for a given initial lens position, a plurality of local focus positions around the initial lens position can be obtained by adjusting the lens position and/or by adjusting the position/setting of one or more elements of the lens to the extent necessary to alter focus of the lens by a desired amount. Hence, a local focus position is a position and/or setting of the lens and/or the elements therein at or around a given lens position which results in a particular focus setting of a device. For example, a lens can be zoomed out to its most extreme zoom position, and local focus positions can be obtained by slightly adjusting the lens position and/or that of any lens elements of the lens at or around the extreme zoom position. This can occur without, if appropriate, deviating from the extreme zoom position by a substantial amount (for example by adjustment of internal elements of the lens only).

In the spatial domain the ratio can be generated using the accumulated power of a band pass filter applied to each image. The ratio is normalised in the sense that if the accumulated power for an image A is P1 and for another image B is P2 then the normalised ratio is given by (P1−P2)/(P1+P2).

Figure 2:
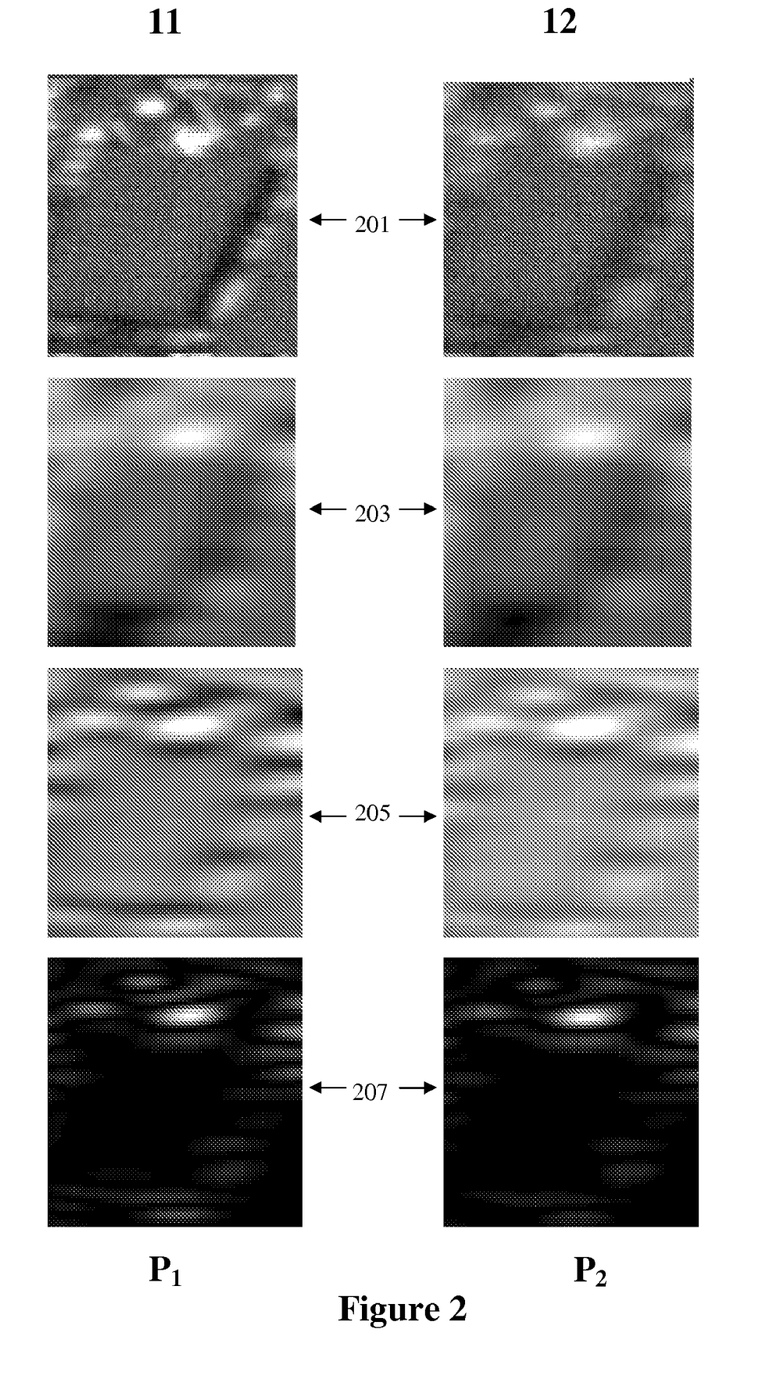
FIG. 2 is a flow diagram representing a procedure for generating the accumulated power of two image portions.

FIG. 2 is a flow diagram representing a procedure for generating the accumulated power of two image portions, I1 and I2, representing parts of a subject to be focussed.

The raw image data 201, as generated by sensor 101 for example, is filtered using a low pass filter to select a cut-off frequency on the high frequency end of image frequency content, thereby filtering a portion of the high spatial frequency content of the image. Low pass filtering can be performed by convolution with a Gaussian filter (such as a 2D Gaussian filter) for example. This results in smoothed image data 203. A Laplacian filter, or similar, to limit the low frequency end is then applied to data 203 resulting in the filtered data 205, in which a portion of the low spatial frequency content of the data 203 is filtered. Data 207 representing the powers P1 and P2 of image portions I1, I2 can then be obtained from the square of data 205, i.e. the square of the band-pass data.

The symmetrical band-pass power ratio PR for the images I1, I2 is defined by:

$$PR = \frac{\sum P1 - \sum P2}{\sum P1 + \sum P2}$$

where the accumulation is over the whole of the image region in question.

As P1 and P2 are powers and are therefore always positive (the square of the filtered data 205), the ratio is well behaved. Further, since it is normalised, the ratio lies between the values +1 and −1 and when plotted against the corresponding lens positions of a device at which the image data used to determine ratio was generated, has a zero crossing substantially at a lens position resulting in true focus. Hence, a value of zero (or substantially zero) for the normalised power ratio metric indicates a lens position at which the image in question will be focussed. At the zero crossing of the power ratio metric the two images that give rise to the zero uniformly straddle the focus position and hence have equal degrees of defocus, and the position corresponding to a power ratio metric always lies between the two image locations used to compute the metric.

Figure 3:
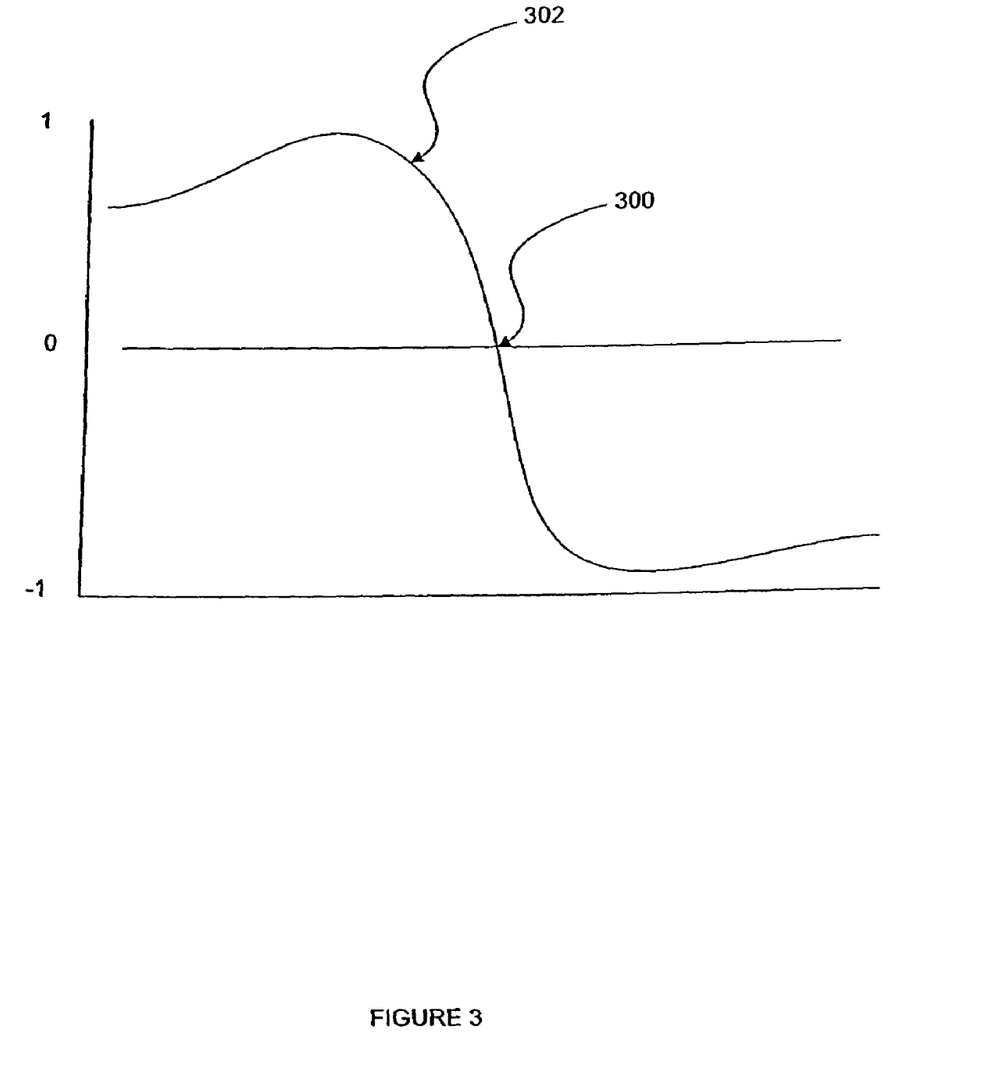
FIG. 3 is a schematic representation of a characteristic normalised power ratio metric curve.

The normalised band pass power ratio produces a characteristic curve. FIG. 3 is a schematic representation of such a characteristic curve.

The shape of the normalised ratio metric either side of true focus is largely independent of image content, and the ratio of the power from two different focus positions depends largely on the distance from true focus. The metric essentially combines power across the pass band of the band-pass filter. Hence it also depends on the frequency distribution of the image across the band pass filter frequency distribution. The tighter the pass band the more image independent the metric will be. In practice, however, the broadness of the band pass proves more stable than considering individual (or small groups of individual) frequency contributions in isolation (obtained using the Fourier transform).

FIG. 3 illustrates that the lens position for true focus is located at the zero crossing 300. There is a return to zero at each extreme from true focus (not shown). The location of the return to zero tends to positive and negative infinity as the frequency spectrum of the band pass is reduced (by increasing the size of the Gaussian filter for example).

In practice it is much easier to find the zero crossing of the band pass power ratio than the peak of traditional focus metrics. More specifically, the sign of the power ratio (i.e. whether it is positive or negative in value) identifies the direction along the curve to be moved to reach true focus (the zero crossing). Hence, with reference to FIG. 3, a positively valued metric measure indicates that true focus is in the right-hand direction along the curve, whist a negatively valued metric measure indicates that true focus is in the left-hand direction along the curve, and a lens can be adjusted accordingly in order to provide a focussed image. Step size when searching for true focus (i.e. a amount by which a lens position is adjusted) can be considerable as the coarse level zero crossing can easily be detected. Once the coarse level zero crossing has been identified, a fine scale estimation can be obtained by capturing an additional image or more between existing samples. There is generally no need to recurse down to the zero crossing itself because, advantageously, in the region of the zero crossing the characteristic curve produced by the power ratio is substantially linear, and hence simple linear interpolation can be used to give an estimate of the focus position. Other alternatives are possible.

According to a preferred embodiment, true focus is determined by processing data representing at least two images captured at respective distinct local focus positions of a lens of a camera, in order to generate normalised power ratio data. That is to say, at a given lens position, the position of the lens and/or the focus setting of one or more lens elements, or the lens itself, is adjusted in order to provide two out of focus images from which a normalised power ratio metric for the images can be determined, thereby indicating a direction in which the lens should be adjusted in order to reach a point of true focus (i.e. the zero crossing of the metric curve). More specifically, the power ratio data is used to determine a notional position on a curve (such as that in FIG. 3 for example). The determined position is used in order to determine in which direction a camera lens should be moved or adjusted in order to achieve the desired level of focussing.

It will be appreciated that a given lens position can result in a plurality of images of differing focus due to the plurality of possible focus positions of the lens (or its elements) at or around the particular lens position as a result of lens and/or element adjustment as explained above.

If a lens position results in a generated normalised power ratio metric value at a point 302, for example, on the curve, it can be seen that adjustment of the lens, or an element thereof, in the direction (for example) necessary to reach true focus is that adjustment which causes the value of the normalised power ratio metric to reduce in value (i.e. in a right-hand direction along the curve). A coarse estimation of the point of true focus can therefore be determined.

In the region of the zero crossing, the normalised power ratio metric curve is approximately linear. Therefore, if at least two points on a curve such as that of FIG. 3 have been determined by driving a lens of a device and generating a power ratio metric at the lens positions, linear interpolation can be used to estimate a more accurate position for the true focus, particularly, but not exclusively, if the two positions occur at points above and below true focus (i.e. the points have opposing signs).

If they do not have opposing signs, a further metric point for the curve can be generated with an opposing sign compared to the other generated points in order to perform interpolation of the point of true focus. Alternatively, the two points with the same sign can be used in order to extrapolate the zero crossing and hence the position of true focus.

Figure 4:
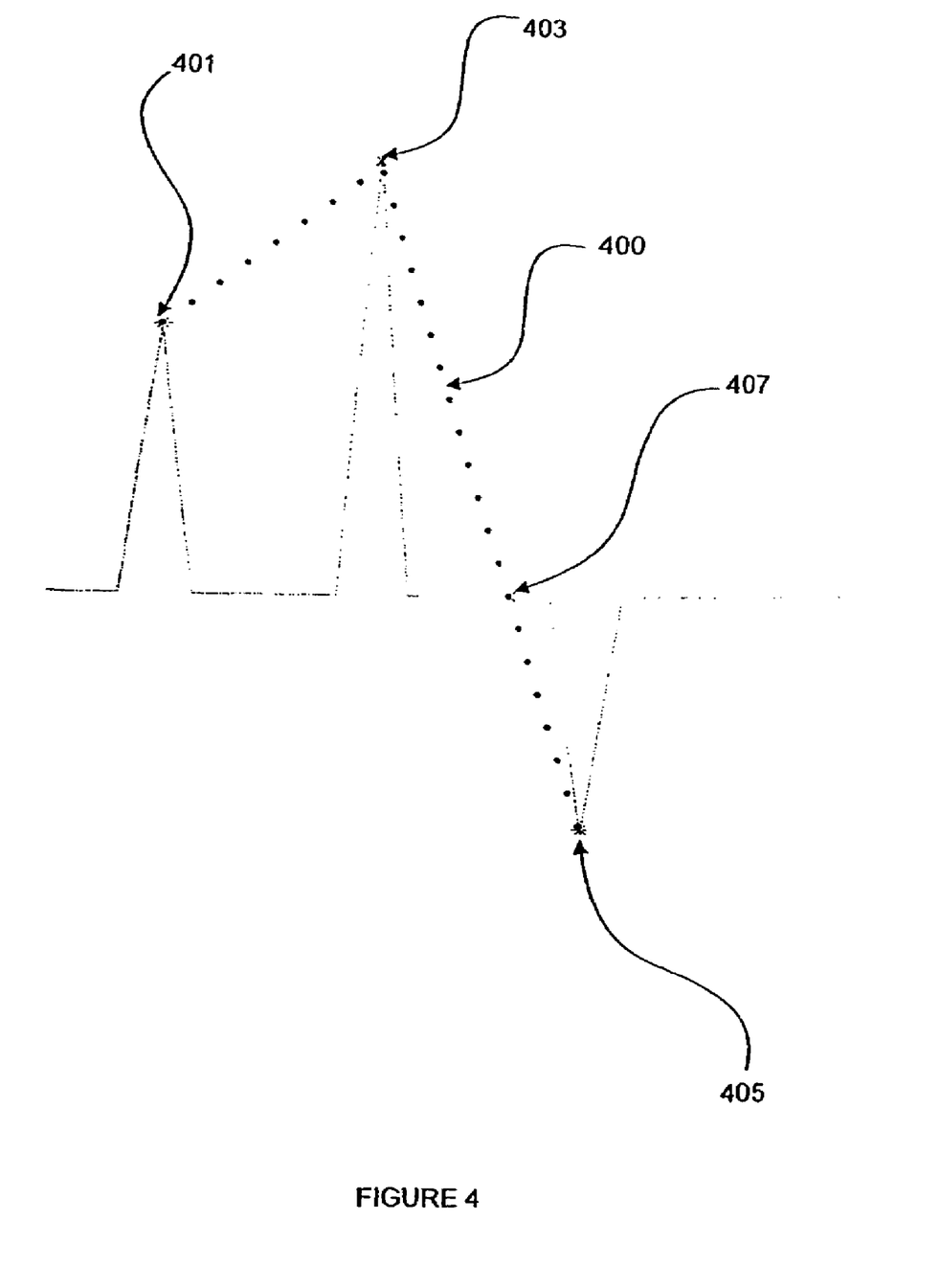
FIG. 4 is a schematic representation of a linear interpolation operation.

FIG. 4 is a schematic representation of a linear interpolation procedure. Points 401, 403 and 405 on a notional curve 400 are determined as explained above. Point 405 has an opposite sign compared to points 401 and 403, and therefore enables interpolation of point 407 (true focus).

The result from the initial metric calculation is used to determine a direction in which to drive the lens in order to generate subsequent metric values, i.e. the values of 401 and 403 indicate that the lens must be driven in a direction necessary to generate a metric value to the right of points 401,403 on the curve. The set of generated values is used to interpolate a position of true focus 407.

Hence, 401 (with a positive value) indicates a movement to the right hand direction along the curve is necessary, resulting in data at point 405 (from which 407 can be interpolated). If, for example, 403 was negatively valued, 407 could have been interpolated using 401 and 403 only.

It will be appreciated that the position of the zero crossing can be extrapolated using at least two positions on the metric curve which have the same sign (positive or negative), and the provision of positive and a negative valued metric data is not necessary in order to be able to determine true focus.

Figure 5:
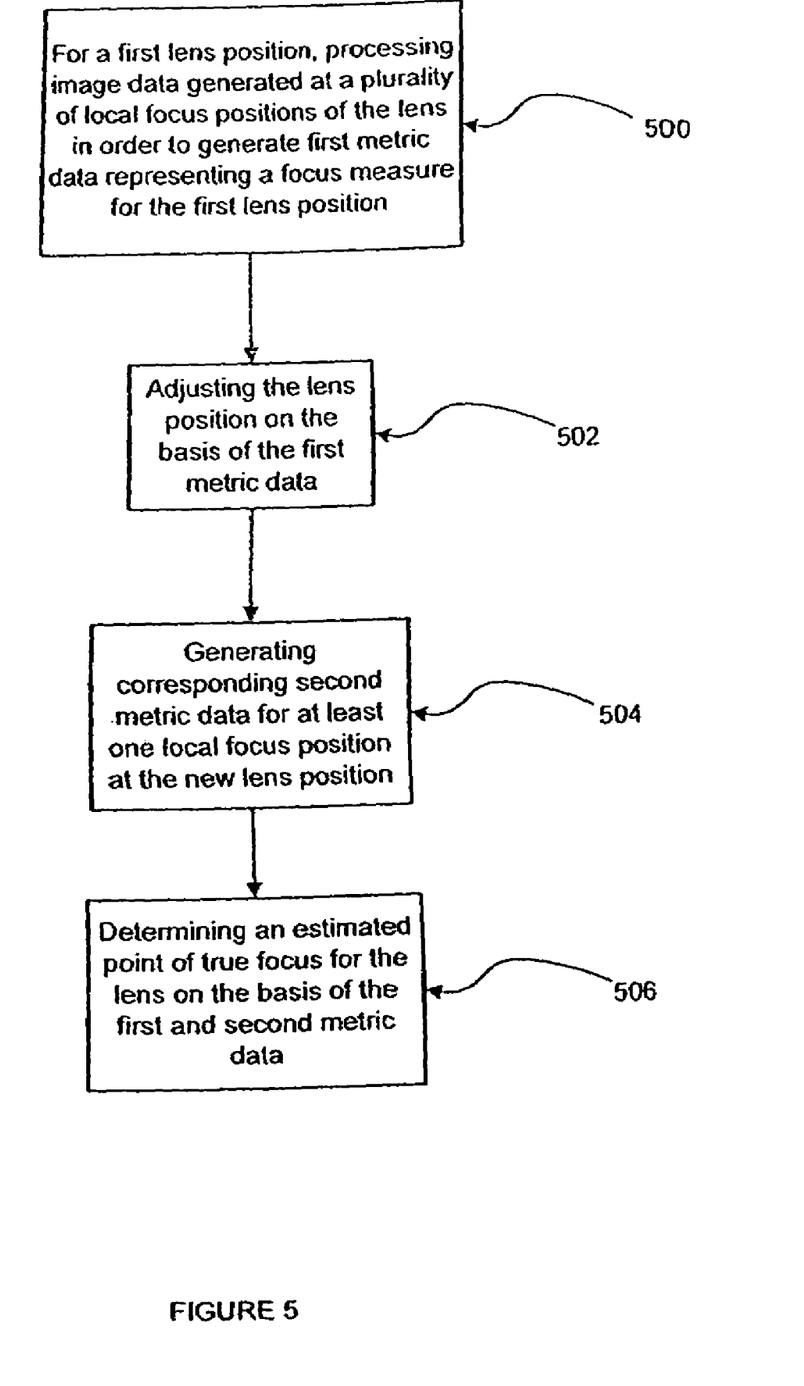
FIG. 5 is a flow diagram representing an exemplary procedure for auto focus.

FIG. 5 is a flow diagram of an exemplary procedure for determining a point of true focus. At step 502, and for a first lens position of a device, image data generated at a plurality of focus positions of the lens is processed using a suitable processor such as 105 for example, in order to generate first metric data representing a normalised power ratio metric for the first lens position. At 504 a lens position is adjusted on the basis of the first metric data, and at step 506 corresponding second metric data is generated for at least one focus position at the new lens position. At step 508, an estimated point of true focus for the lens is determined on the basis of the first and second metric data.

Figure 6:
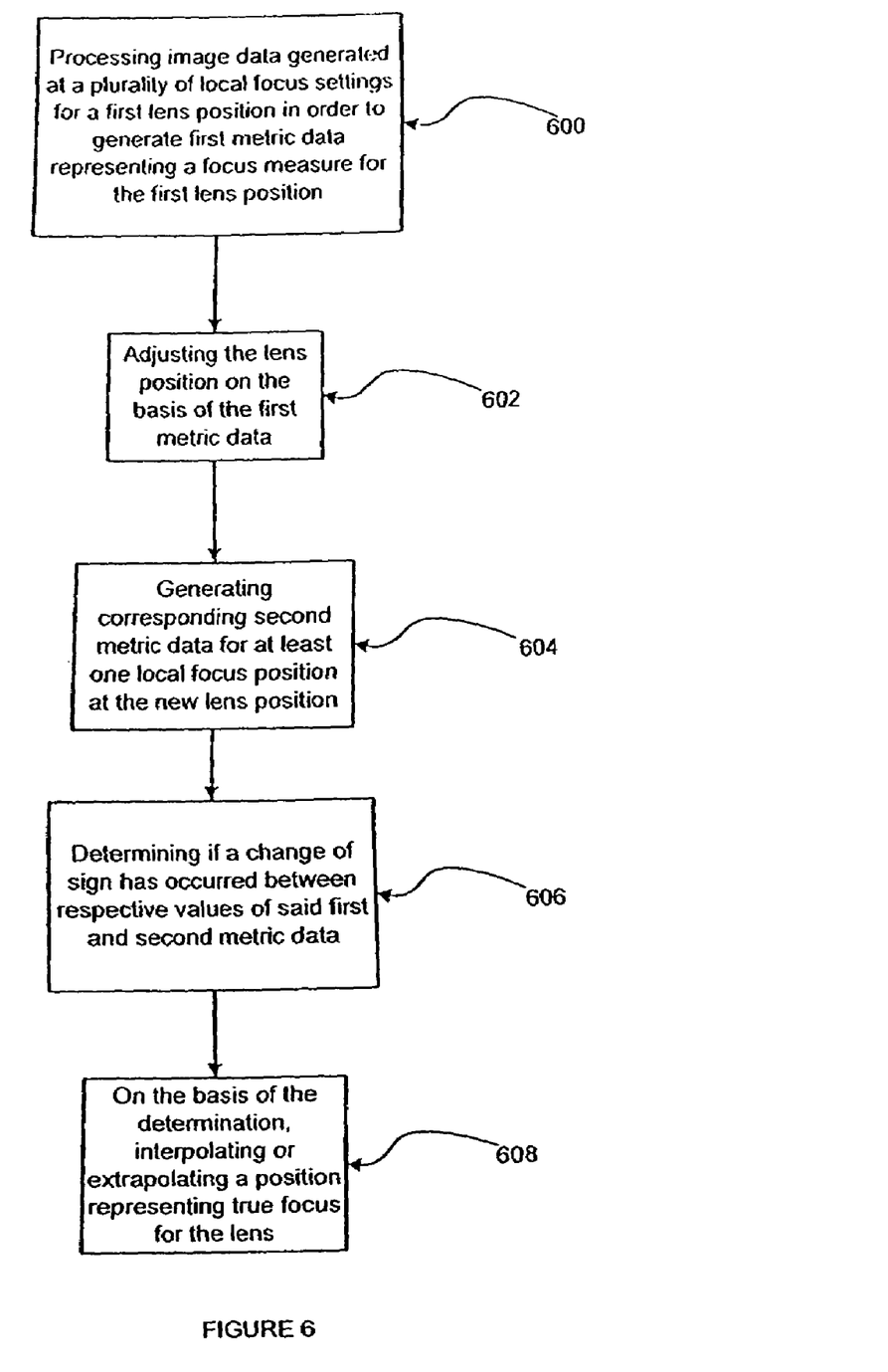
FIG. 6 is a further flow diagram of an exemplary procedure for determining a point of true focus.

FIG. 6 is a further flow diagram of an exemplary procedure for determining a point of true focus. At step 600, and for a first lens position, image data generated at a plurality of focus positions of the lens is processed using a suitable processor such as 105 for example, in order to generate first metric data representing a normalised power ratio metric for the first lens position. At step 602 a lens position is adjusted on the basis of the first metric data, and at step 604 corresponding second metric data is generated for at least one focus position at the new lens position. At step 606 it is determined (by processor 105 for example) if a change of sign has occurred between respective values of said first and second metric data, and at 608, on the basis of the determination, a position of true for the lens is interpolated.

The invention claimed is:

1. A method for automatic focus for an image capture device comprising a lens, the method comprising:
   for a first lens position, processing image data generated at a plurality of local focus positions of the lens in order to generate first metric data representing a focus measure for the first lens position, wherein said first metric data is a normalized power ratio metric which is obtained by (P1−P2)/(P1+P2), wherein P1 is an accumulated power for an image and P2 is an accumulated power for a second image;
   adjusting the lens position on the basis of the first metric data, and generating corresponding second metric data for at least one local focus position at the new lens position; and
   determining an estimated point of true focus for the lens on the basis of the first and second metric data.

2. A method as claimed in claim 1, wherein the focus measure is an image content independent focus metric.

3. A method as claimed in claim 2, wherein a symmetrical band-pass power ratio (PR) for the image (P1) and the second image (P2) is defined by $PR=(\Sigma P1-\Sigma P2)/(\Sigma P1+\Sigma P2)$.

4. A method as claimed in claim 1, further comprising adjusting the lens position to the determined estimated point of true focus.

5. A method as claimed in claim 1, wherein the plurality of focus positions of the lens are centred around the first lens position.

6. A method as claimed in claim 1, wherein determining an estimated point of true focus comprises:
   using said first and second metric data to interpolate or extrapolate a position of true focus.

7. A method as claimed in claim 1, further comprising:
   determining a respective value for said first and second metric data;
   on the basis of the respective values determining a direction in which to adjust a lens position; and
   adjusting the lens position accordingly.

8. A method as claimed in claim 7, further comprising:
generating additional metric data for at least one local focus position at the new lens position;
determining if the value of said additional metric data differs in sign to that of the value said first and second metric data; and
on the basis of the determination, interpolating or extrapolating a position representing true focus.

9. A method of automatic focus for use with an image capture device comprising a lens, the method comprising:
processing image data generated at a plurality of local focus settings for a first lens position in order to generate first metric data representing a focus measure for the first lens position, wherein said first metric data is a normalized power ratio metric which is obtained by (P1−P2)/(P1+P2), wherein P1 is an accumulated power for an image and P2 is an accumulated power for a second image;
adjusting the lens position on the basis of the first metric data;
generating corresponding second metric data for at least one local focus position at the new lens position;
determining if a change of sign has occurred between respective values of said first and second metric data; and
on the basis of the determination, interpolating or extrapolating a position representing true focus for the lens.

10. A method as claimed in claim 9, wherein the focus measure is an image content independent focus metric.

11. A method as claimed in claim 10, wherein a symmetrical band-pass power ratio (PR) for the image (P1) and the second image (P2) is defined by PR=(ΣP1−ΣP2)/(ΣP1+ΣP2).

12. A method as claimed in claim 9, wherein, if no change of sign has occurred, further comprising:
adjusting the lens position; and
generating corresponding third metric data for at least one local focus position for the new lens position.

13. A method as claimed in claim 9, where a point of true focus for the lens is the lens position and/or setting resulting in metric data with a value of substantially zero.

14. A method as claimed in claim 13, wherein a point of true focus for the lens is the lens position and/or setting at which the value of the normalised power ratio metric is zero.

15. Image capture apparatus comprising a lens and a processor, the processor operable to:
for a first lens position, process image data generated at a plurality of local focus positions of the lens, in order to generate first metric data representing an image content independent metric for the first lens position, wherein said first metric data is a normalized power ratio metric which is obtained by (P1−P2)/(P1+P2), wherein P1 is an accumulated power for an image and P2 is an accumulated power for a second image;
on the basis of the first metric data, generate data operable to effect adjustment of the lens position, and generate corresponding second metric data for at least one local focus position at the new lens position; and
determine an estimated point of true focus for the lens on the basis of the first and second metric data.

16. Apparatus as claimed in claim 15, wherein the processor is operable to use said first and second metric data in order to interpolate or extrapolate a position of true focus.

17. Apparatus as claimed in claim 15, wherein the processor is operable to:
determine a respective value for said first and second metric data;
on the basis of the respective values, determine a direction in which to adjust a lens position.

* * * * *